United States Patent [19]
Valente

[11] 3,858,471
[45] Jan. 7, 1975

[54] FLANGE PUNCH POSITIONING APPARATUS

[75] Inventor: Raymond L. Valente, Kankakee, Ill.

[73] Assignee: Manco Mfg. Co., Bradley, Ill.

[22] Filed: Dec. 18, 1973

[21] Appl. No.: 426,098

Related U.S. Application Data

[62] Division of Ser. No. 302,345, Oct. 30, 1972, Pat. No. 3,817,135.

[52] U.S. Cl............................ 83/368, 83/527, 83/560
[51] Int. Cl................................................. B26f 1/02
[58] Field of Search.......... 77/3, 13, 46, 50; 83/368, 83/560, 559, 527, 240, 522

[56] References Cited
UNITED STATES PATENTS

| | | | |
|---|---|---|---|
| 1,241,255 | 9/1917 | Hawthorne.................... | 83/368 UX |
| 3,090,261 | 5/1963 | Hill................................ | 408/3 |
| 3,094,015 | 6/1963 | Mead............................. | 408/3 |
| 3,127,661 | 4/1964 | McConnell.................... | 408/46 X |
| 3,253,484 | 5/1966 | Hill................................ | 408/13 X |
| 3,785,235 | 1/1974 | Peddinghaus et al......... | 83/368 UX |

Primary Examiner—J. M. Meister
Attorney, Agent, or Firm—Olson, Trexler, Wolters, Bushnell & Fosse, Ltd.

[57] ABSTRACT

The embodiment of the invention disclosed herein is directed to a flange punch positioning apparatus for locating holes to be formed through flange portions of structural members such as I-beams, channels, and angles. In the case of I-beams, the holes formed in the flanges are located with respect to the horizontal line or plane bisecting the horizontal web portions. In the case of forming holes in channels or angles the holes are located in the flange with respect to the bottom surface of the horizontal web. The apparatus automatically positions the punch at the desired height along the flange by using a pair of diametrically opposed axially movable sensing rods which engage both sides of the web portion of the structural member to sense the relative level of the web. Once the proper reference level is sensed, the punch mechanism is moved into position above and/or below the web and the hole is formed.

2 Claims, 7 Drawing Figures

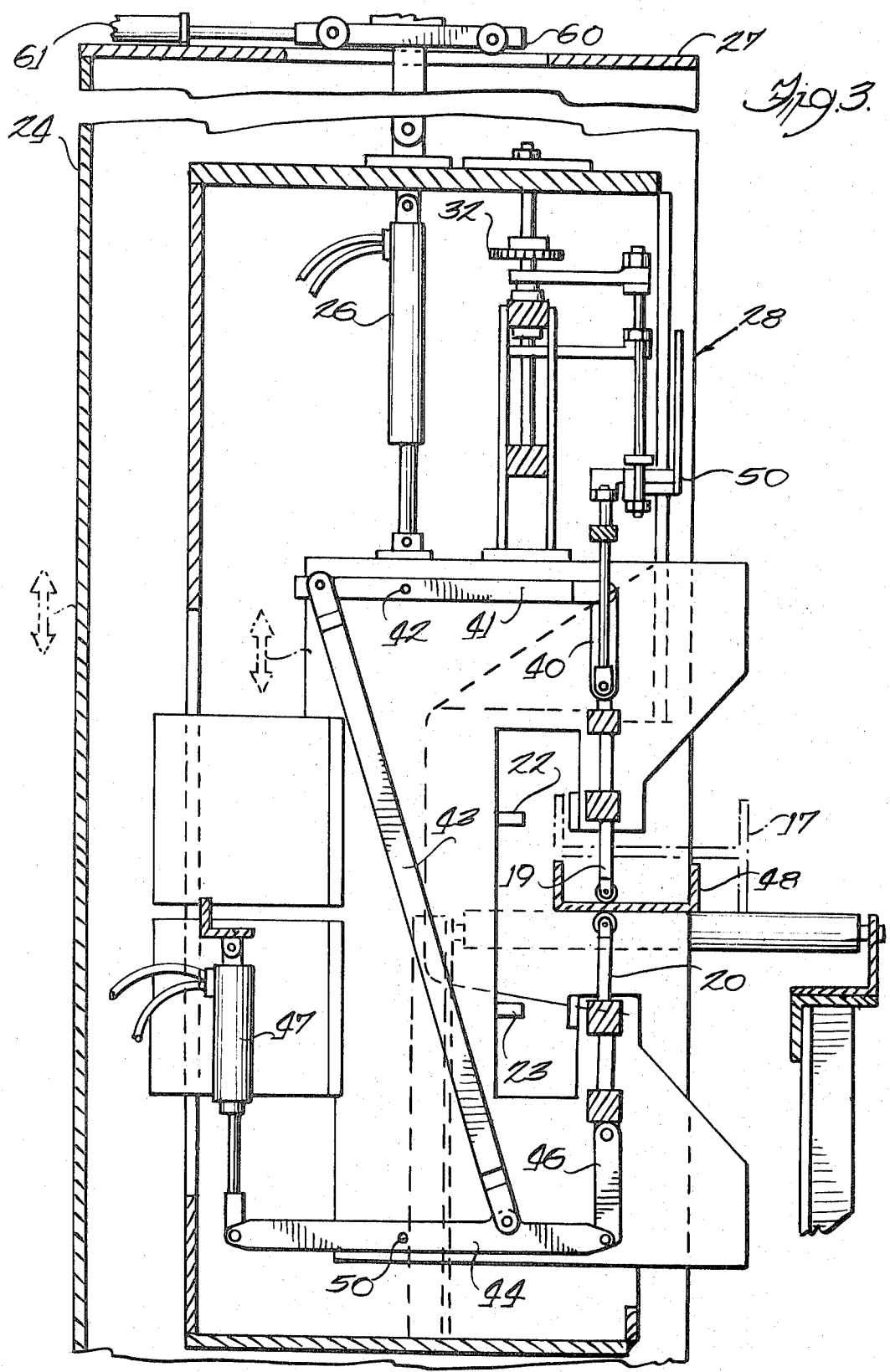

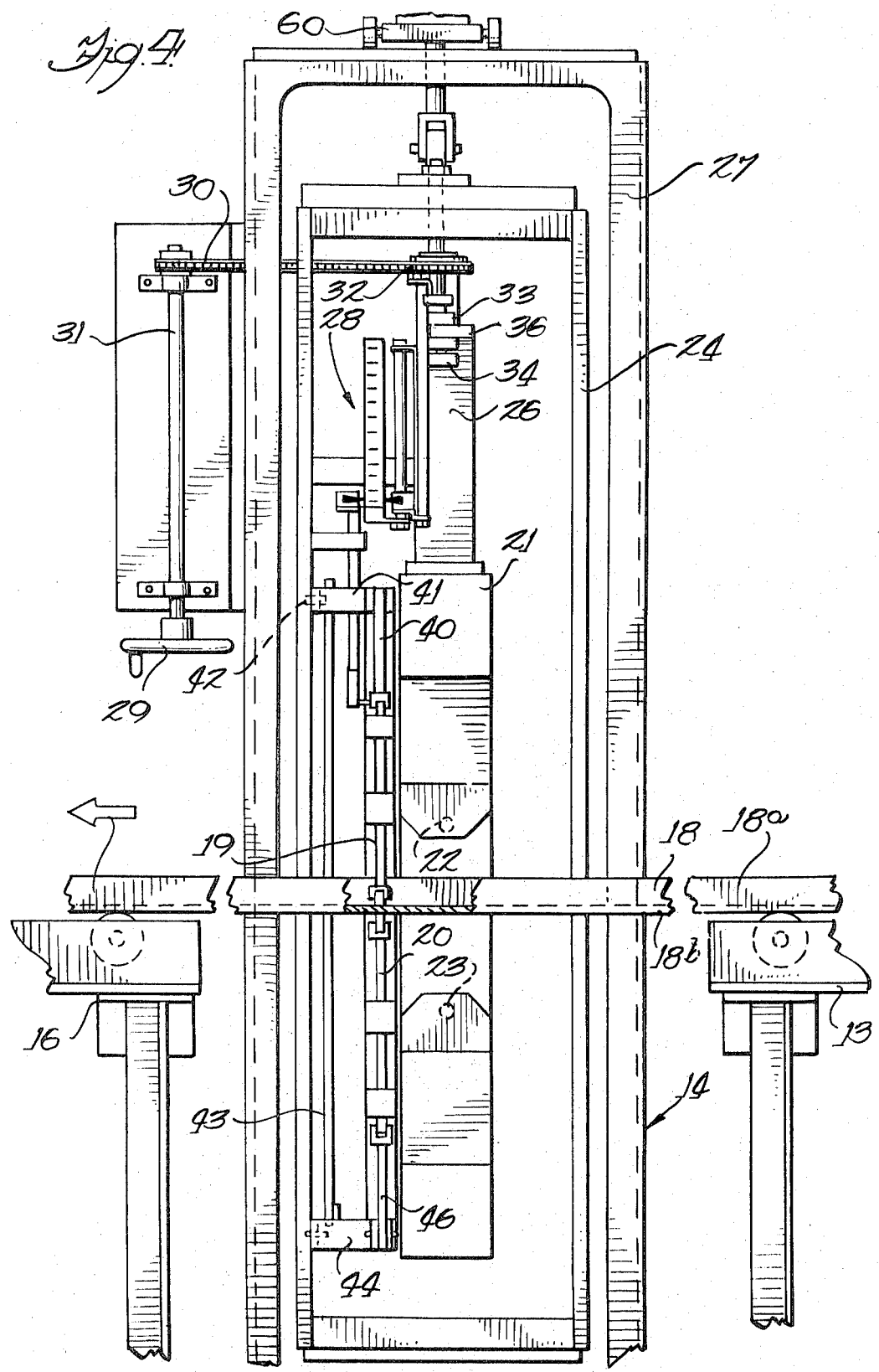

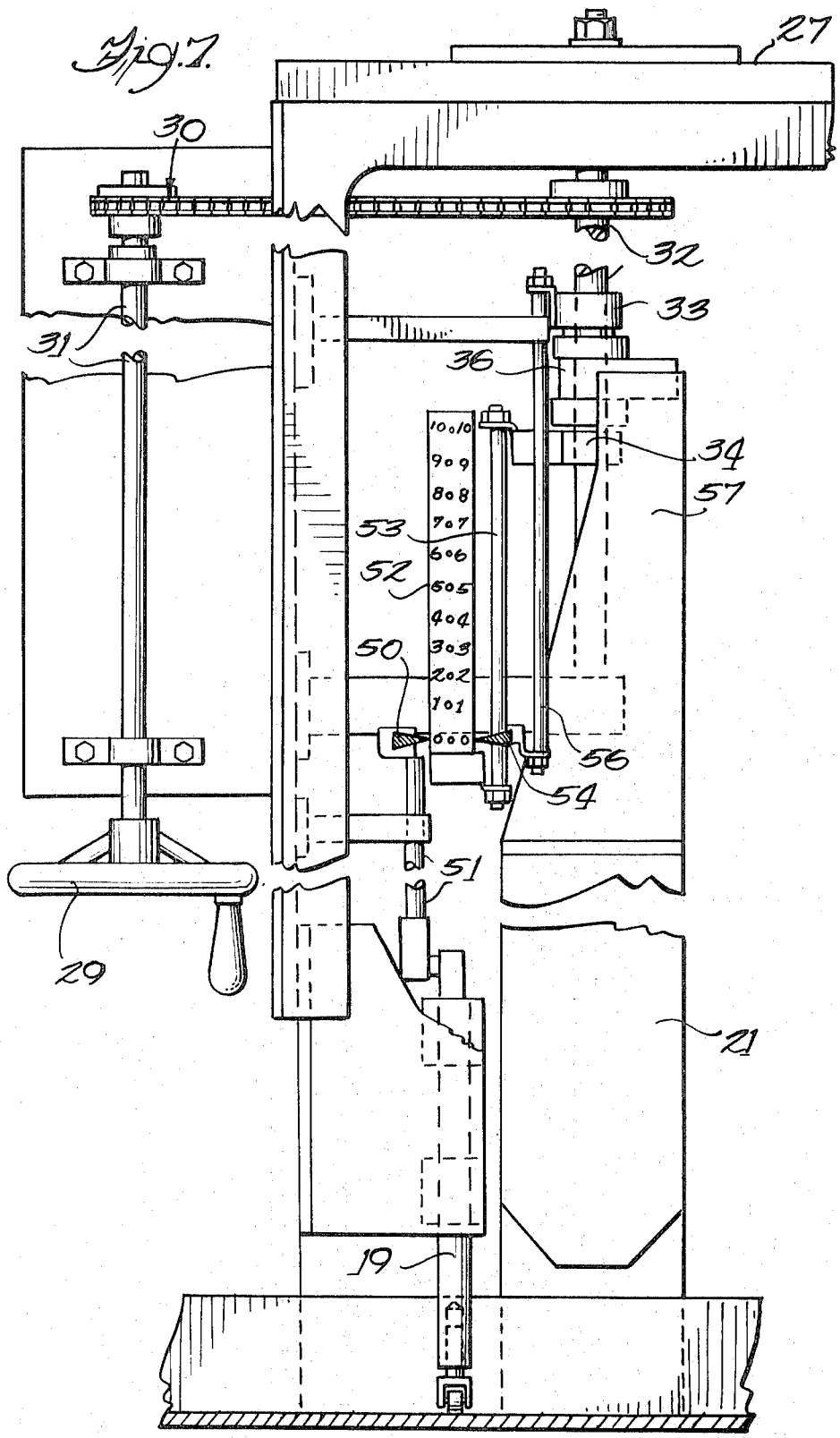

FLANGE PUNCH POSITIONING APPARATUS

REFERENCE TO OTHER APPLICATIONS

This is a divisional application of Ser. No. 302,345 filed Oct. 30, 1972, now U.S. Pat. No. 3,817,135.

BACKGROUND OF THE INVENTION

This invention relates generally to apparatus for punching holes in structural members such as I-beams, channels and angles, and more particularly to an apparatus for automatically positioning a punch mechanism at the desired level above a reference line to form holes in the flange portions of the structural members.

The ever increasing use of structural steels for building materials has prompted the advent of prefabricated structural subassemblies to be formed prior to positioning the structural members in place on a building, or the like, and secured thereto. Such prefabrication of subassemblies can take place either at the manufacturer's plant or on the site at ground level before the structural unit is hoisted into position. Because of the tolerances required of prefabricated subassemblies, each of the structural components that go into its making must be controlled for proper tolerance in such things as the location of holes which receive fasteners such as bolts, rivets and the like. Heretofore, the accurate location of such holes was accomplished manually. Because of the large number of such structural members being used today in the construction of highrise buildings and the like, it has become financially disadvantageous to continue manual location of such holes.

SUMMARY OF THE INVENTION

Accordingly, it is an object of this invention to provide an apparatus for automatically sensing a reference level of a structural member and therefrom automatically position a punch at the desired location above the reference levels to form holes in the flange portions thereof.

Another object of this invention, particularly from a manufacturing standpoint, is to provide an apparatus for quickly and inexpensively sensing the web portion of structural members and forming holes a precise location in the flange portion as measured from the web portion.

Briefly, the present invention is directed to positioning apparatus for locating and punching holes in the upstanding flanges of such workpieces as I-beams, channels and angles. The holes are located with respect to the horizontal web portion of these workpieces. In the case of I-beam structural members the holes are located above and below the horizontal center line passing through the horizontal web portion of the I-beam. In the case of angles and channels the holes are located by reference to the bottom surface of the horizontal web, this bottom surface corresponding to the top bed surface of a roller conveyor, or the like. The present apparatus includes means for automatically positioning a C-frame carrying a pair of punches at the diametrically opposed open end portions of the C-frame so that either the upper flange or the lower flange portions can be punched. The C-frame receives the flange portions therein and is actuated to the proper position to form the hole in either the lower flange or the upper flange, whichever the case may be.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 3 is a partial elevational sectional view of a C-clamp punch frame and positioning mechanism constructed in accordance with this invention;

FIG. 4 is a front view of the apparatus of FIG. 3;

FIG. 5 is an end view of an I-beam structural member which has holes formed therein in accordance with this invention;

FIG. 6 is an end view of an angle structural member which has holes formed therein in accordance with this invention; and FIG. 7 is an enlarged front view of the scale and indicating mechanism of the apparatus of this invention.

DETAILED DESCRIPTION OF THE ILLUSTRATED EMBODIMENT

Figure 1:
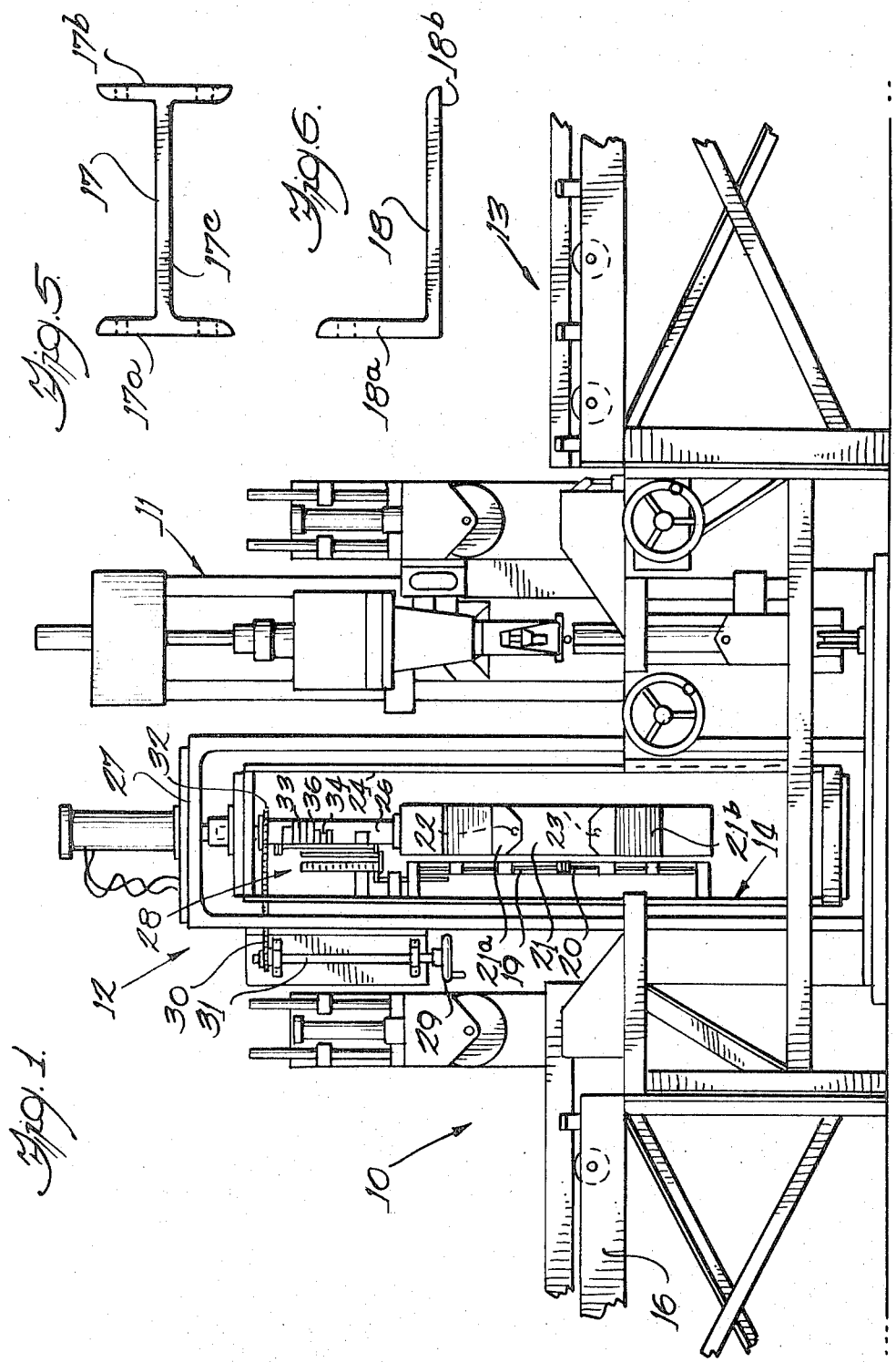
FIG. 1 is a front elevational view of a hole forming machine utilizing the flange punch mechanism of this invention.
Figure 2:
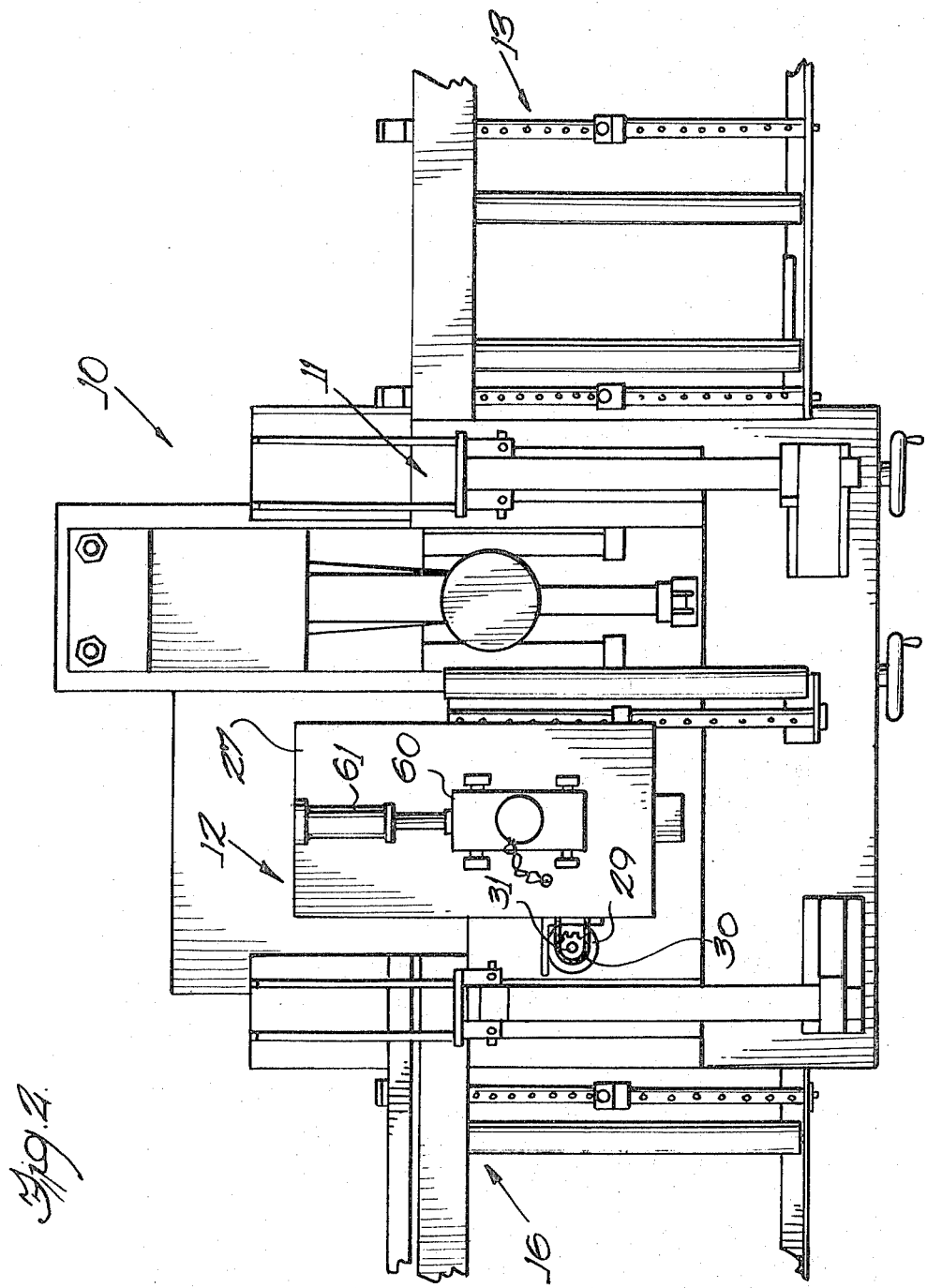
FIG. 2 is a top view of the machine of FIG. 1.

Referring now to FIGS. 1 and 2 there is seen a punching apparatus designated generally by reference numeral 10 which includes two punching stations 11 and 12 for forming holes in the web and flange portions, respectively, of structural members such as I-beam, channel and angles. A roller conveyor 13 is positioned at the input side of the punching apparatus 10 and directs structural members along a conveying path over an open top table 14. The web punch 11 forms holes through the web portion at desired locations therein while the flange punch 12 forms holes in the flanges, these operations being made either sequentially or simultaneously as desired. An output roller conveyor 16 is positioned at the other end of the open top table 14 to receive the finished structural member and transport it to a loading or assembling station. The configuration of the web punch 11 may take any suitable form as this portion of the punching apparatus does not form part of this invention.

More specifically, the novelty of this invention is directed to the arrangement by which the flange punch 12 can be positioned to an accurate location on either side of a web of an I-beam or along the flange portion of a channel or angle. FIG. 5 illustrates an I-beam 17 into which holes are to be formed in the flange portions 17a and 17b. The web portion 17c may have holes formed therein by the web punch 11. The distance of the holes in the flange portions 17a and 17b is determined by measurement from the center line of the web 17c, this being sensed by sensing probes 19 and 20 of the flange punch mechanism 12. On the other hand, an angle iron 18 at FIG. 6 will have the holes formed through the flange portion 18a thereof as measured from the bottom surface of the web portion 18b. When this is the case the top surface of the roller conveyors 13 and 16 define a reference level corresponding to the bottom surface of the web 18b.

The flange punch mechanism 12 includes a C-frame 21 having diametrically spaced apart portions 21a and 21b each carrying horizontally disposed punch and die units 22 and 23, respectively. The C-frame is movably mounted in a movable carriage 24 and supported therein by a hydraulically actuated cylinder 26 fastened to the top end of the C-frame. The carriage 24, together with the C-frame 21 therein, is laterally movable relative to a support frame 27 while the C-frame is movable relative to the carriage. As a workpiece is conveyed from the roller conveyor 13 between the spaced arm portions 21a and 21b of the C-frame 21, the C-frame is moved transversely of the conveying path so that no frictional contact is made with the flange portions passing therethrough. After positioning of the flange of the workpiece at the proper location and before punching operation takes place, the sensing probes 19 and 20 are moved into contact with the web portion of the workpiece so that the carriage 24 and C-frame therein can be positioned at the proper reference line, either the web of the I-beam or the bottom portion of the L or channel member. After the carriage 24 is centered, an indicator and pointer means 28 is adjusted so that the C-frame can be moved either upwardly or downwardly by the cylinder 26 and position the appropriate punch at the proper location. After this positioning is accomplished, the punch mechanism is actuated to form the hole in the flange with the center line of the hole being measured from the reference line of the web portion.

To locate the position of the holes to be formed in the flanges, a hand wheel adjustment means 29 is connected to a chain drive 30 via a shaft 31. The chain drive 30 is then coupled to a sprocket 32 which, in turn, is secured to a threaded shaft having both right hand and left hand threads extending in opposite directions from the center thereof. This shaft transports a pair of upper and lower threaded stop nuts 33 and 34 and a nonthreaded central collar 36 is secured to the C-frame 21 and positioned about the shaft between the stop nuts. The extent of upward or downward travel of the C-frame is then limited by the position of the stop nuts 33 and 34, this limiting action taking effect when the collar 36 engages the appropriate stop nut.

For a better understanding of the operation of the sensing probes 19 and 20, reference is now made to FIGS. 3 and 4. Here the sensing probe 19 is connected to a first link 40 secured to a horizontally disposed pivotal arm 41 which is secured to the inner wall surface of the carriage 24 by means of a pivot pin 42. The arm 41 has the other end thereof pivotally connected to a cross link 43 which, in turn, is connected to a second pivotal arm 44. This second pivotal arm has one end thereof connected to the sensing probe 20 via a link 46 and the other end thereof connected to a hydraulically actuated cylinder 47. When the probes 19 and 20 are sufficiently spaced apart to allow passage of the workpiece 48, here being shown as a channel, or a second workpiece such as the I-beam 17 of FIG. 5, the center position of the carriage 24 is arbitrary at the level of the conveyors. When the probes 19 and 20 are brought into contact with opposite surfaces of the web portion of the workpiece, by outward actuation of the hydraulic cylinder 47, the carriage 24 will be centered at the location of the web. This is accomplished by the fact that the pivotal arm 44 is pivotally secured to the wall of the carriage 24 by means of a pivot pin 50 which corresponds to the pivot pin 42 of the arm 41 and the entire carriage 24 moves in one direction or another so as to cause centering thereof about the web portion of the workpiece being sensed.

As best seen in FIG. 7 the probe 19 is connected to a movable pointer 50 through a rod 51 thereby giving a relative indication of the level of the web with respect to the reference level previously indicated as the top surface of the roller conveyors 13 and 16. When a channel or angle iron is being operated on, the pointer 50 will indicate a zero reference level, this corresponding substantially to the level of the roller conveyor. On the other hand, should the probe 19 be in an elevated position, thus corresponding to the position of the web portion of an I-beam, the pointer 50 will be shifted upwardly to, for example, the 2 or 3 inch mark on a scale 52.

In the illustrated embodiment of this invention the scale 52 is carried by a support rod 53 which, in turn, is secured to the stop nut 34 and movable therewith. On the other hand, a second pointer 54 is carried by a rod 56 which is secured to the other stop nut 33 and movable therewith. Therefore, cranking of the hand crank 29 to rotate the threaded shaft 32 will cause the stop nuts 33 and 34 to move in opposite directions, in this instance they are being moved apart to set the upper and lower limits of travel of the C-frame. The collar 36 is secured to the C-frame 21 by a bracket 57.

To observe a relative distance between the appropriate reference line, either the central web of an I-beam or the bottom surface of a channel or angle, the second pointer 54 is compared with the position of the first pointer 50 and the distance between these pointers, as measured on the scale 52, is that distance between the center line of the particular web involved and the center line of the hole to be formed. For example, cranking the hand wheel 29 will cause pointer 54 and scale 52 to move in diametrically opposite directions by the corresponding threaded movement of the stop nuts 33 and 34. However, during this cranking operation the first stationary pointer 50 does not move, but the scale 52 moves relative thereto. The scale 52 and pointer 54 move in opposite directions and thus will provide a two to one motion between the pointer 54 and the right hand side of the scale and a one to one motion between the pointer 50 and the left hand side of the scale. The observation of the desired dimension is taken between the relative spacing between the two pointers 50 and 54.

Referring again to FIG. 3 the carriage 24 is suspended within the support housing 27 by a roller truck unit 60 actuated by the hydraulic cylinder 61. As mentioned previously, the punch and die portion of the C-frame are moved to be disengaged from the flanges as the workpiece is transported through the apparatus. When the proper position is obtained the hdyraulic cylinder 61 is actuated to the left, as seen on the drawing, and the die portions of the punches are brought into engagement with the inside surface of the corresponding flanges whereupon the punches are actuated to form the holes.

While a single embodiment of this invention has been illustrated, it will be understood that variations and modifications may be effected without departing from the spirit and scope of the novel concepts disclosed and claimed herein.

The invention is claimed as follows:

1. In an apparatus for processing a workpiece such as a structural member having a horizontal portion and an upstanding flange portion, the combination comprising means for supporting workpiece processing tool means adjacent said flange of a workpiece, means for adjusting said tool support means transversely of said flange for selectively positioning the tool means in accordance with the location of a side surface of a horizontal portion and in accordance with a plane substantially bisecting said horizontal portion, and opposed sensing elements movably secured to said adjusting means and engageable with the opposite sides of said horizontal portion for sensing said plane bisecting the horizontal portion, whereby said tool support means is moved transversely of said flange for positioning the tool at a predetermined location as measured from said plane.

2. A combination, as defined in claim 1, wherein said adjusting means includes means for engaging and maintaining said sensing elements in fixed relationship against opposite sides of said horizontal portion and then relatively moving said tool support means and said sensing elements for adjusting the tool means transversely of said flange portion.

* * * * *